US012624735B2

(12) United States Patent　　　(10) Patent No.:　US 12,624,735 B2

Kumar　　　　　　　　　　　　　　(45) Date of Patent:　　May 12, 2026

(54) CALIPER BRAKE

(71) Applicant: HL MANDO CORPORATION,
Pyeongtaek (KR)

(72) Inventor: Sudhir Kumar, Haryana (IN)

(73) Assignee: HL MANDO CORPORATION,
Pyeongtaek (KR)

( * ) Notice: Subject to any disclaimer, the term of this
patent is extended or adjusted under 35
U.S.C. 154(b) by 438 days.

(21) Appl. No.: 18/333,571

(22) Filed: Jun. 13, 2023

(65) Prior Publication Data

US 2023/0400071 A1　　Dec. 14, 2023

(30) Foreign Application Priority Data

Jun. 13, 2022　　(KR) ......................... 10-2022-0071745

(51) Int. Cl.
*F16D 65/00*　　　　　(2006.01)
(52) U.S. Cl.
CPC ................................. *F16D 65/0075* (2013.01)
(58) Field of Classification Search
CPC .......... F16D 65/0068–0075; F16D 65/18–186;
F16D 55/226–227; F16D 2125/06–08
See application file for complete search history.

(56) References Cited

U.S. PATENT DOCUMENTS

2019/0118789 A1 * 4/2019 Bourlon ................ B60T 13/741

FOREIGN PATENT DOCUMENTS

| CN | 108223622 B | | 5/2021 | |
|----|-------------|---|--------|---|
| DE | 102009012235 A1 | | 9/2009 | |
| KR | 20130029827 A | * | 3/2013 | |
| KR | 102169726 B1 | * | 10/2020 | ............. F16D 3/065 |
| KR | 20210128691 A | | 10/2021 | |

OTHER PUBLICATIONS

KR OA dated Sep. 29, 2025.

* cited by examiner

*Primary Examiner* — David R Morris
(74) *Attorney, Agent, or Firm* — Harvest IP Law, LLP

(57) ABSTRACT
A caliper brake includes a carrier in which a pair of pad
plates are installed to move forward to and backward from
a disc, a caliper housing slidably installed on the carrier and
provided with a cylinder, a piston installed in the cylinder
and provided to move forward to and backward from the pad
plate by brake hydraulic pressure, and a friction reducing
part provided between an inner circumferential surface of
the caliper housing and an outer circumferential surface of
the piston, wherein the friction reducing part includes a ball
interposed between the inner circumferential surface of the
housing and the outer circumferential surface of the piston
and a cage configured to accommodate the ball.

14 Claims, 5 Drawing Sheets

CALIPER BRAKE

CROSS-REFERENCE TO RELATED APPLICATION

This application claims the benefit of Korean Patent Application No. 2022-0071745, filed on Jun. 13, 2022 in the Korean Intellectual Property Office, the disclosure of which is incorporated herein by reference.

BACKGROUND

1. Field

Embodiments of the present disclosure relate to a caliper brake device of a vehicle, and more particularly, to a caliper brake device of a vehicle in which the durability of components arranged in the caliper brake is increased.

2. Description of the Related Art

In general, a vehicle necessarily includes a braking system for braking and various types of braking systems are proposed for the safety of passengers and cargo.

Specifically, a caliper brake among braking systems is a braking system in which brake pads come into contact with and press both sides of a brake disc, which rotates with wheels, to obtain a braking force by friction between the brake disc and the brake pads. Since such a caliper brake performs braking by friction, the wear of components located in the caliper brake inevitably occurs. The wear of components increases the maintenance costs of a vehicle because the components have to be replaced periodically, and also poses a risk to the safety of passengers and cargo.

Specifically, in the conventional caliper brake system, a method of fastening a piston to a caliper housing is a fastening method in which a piston is forcibly press-fitted into a cylinder in a caliper housing through a hydraulic pressure generation device. This fastening method causes direct friction between the caliper housing and the piston upon braking and also causes overall friction between the cylinder and the piston in the caliper housing. Accordingly, a problem was generated in that lifetime of components in the caliper brake is greatly shortened and the speed of a piston is reduced.

Therefore, in a caliper brake, a technology for minimizing the friction between a caliper brake and a piston upon braking is required.

RELATED ART

Patent Document

Korean Laid-open Patent No. 10-2021-0128691 (Published on Oct. 27, 2021)

SUMMARY

Therefore, it is an aspect of the present disclosure to provide a caliper braking device in which the overall friction between a caliper housing and a piston is prevented during braking of a caliper brake of a vehicle.

It is another aspect of the present disclosure to provide an elastic restoring force which assists a piston to move backward during braking of a caliper brake of a vehicle.

It is still another aspect of the present disclosure to provide a caliper brake device which increases the speed of a piston during braking of a caliper brake of a vehicle.

Additional aspects of the disclosure will be set forth in part in the description which follows and, in part, will be obvious from the description, or may be learned by practice of the disclosure.

In accordance with one aspect of the present disclosure, a caliper brake device includes a carrier in which a pair of pad plates are installed to move forward to and backward from a disc; a caliper housing slidably installed on the carrier in which a pair of pad plates are installed and provided with a cylinder; a piston configured to move forward to and backward from the pad plate on the cylinder; and a friction reducing part provided between an inner circumferential surface of the caliper housing and an outer circumferential surface of the piston, wherein the friction reducing part includes a ball interposed between the inner circumferential surface of the caliper housing and the outer circumferential surface of the piston and a cage configured to support the ball.

The caliper brake may further include a support member provided between the inner circumferential surface of the caliper housing and the outer circumferential surface of the piston to prevent the friction reducing part from separating from the inside of the caliper housing.

The piston may further include a stepped portion provided to face the support member so that the piston comes into contact with the support member and then is spaced apart from the support member.

The cage may include an opening formed to pass therethrough in a radial direction to accommodate the ball.

The support member may be formed as an elastic body to provide a restoring force to the piston.

The caliper housing may be provided with an accommodation groove formed to be recessed in the inner circumferential surface thereof in the radial direction and coupled to at least a part of the support member.

The support member may be formed in a ring shape along the inner circumferential surface of the caliper housing.

The opening may be provided as a plurality of openings to accommodate a plurality of balls.

The plurality of balls and the plurality of openings may be arranged in a circumference direction of the cage, and a plurality of rows may be arranged in an axial direction of the cage.

The balls and the openings arranged in any one row may be arranged in the same phase with respect to the balls and openings arranged in adjacent rows.

The balls and the openings in the plurality of rows may be arranged in a different phase with respect to the balls and openings arranged in adjacent rows.

The plurality of rows of balls and openings may include a first row arranged in a first phase and a second row arranged in a second phase which is different from the first phase, wherein the first row and the second row may be alternately arranged in the axial direction of the cage.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
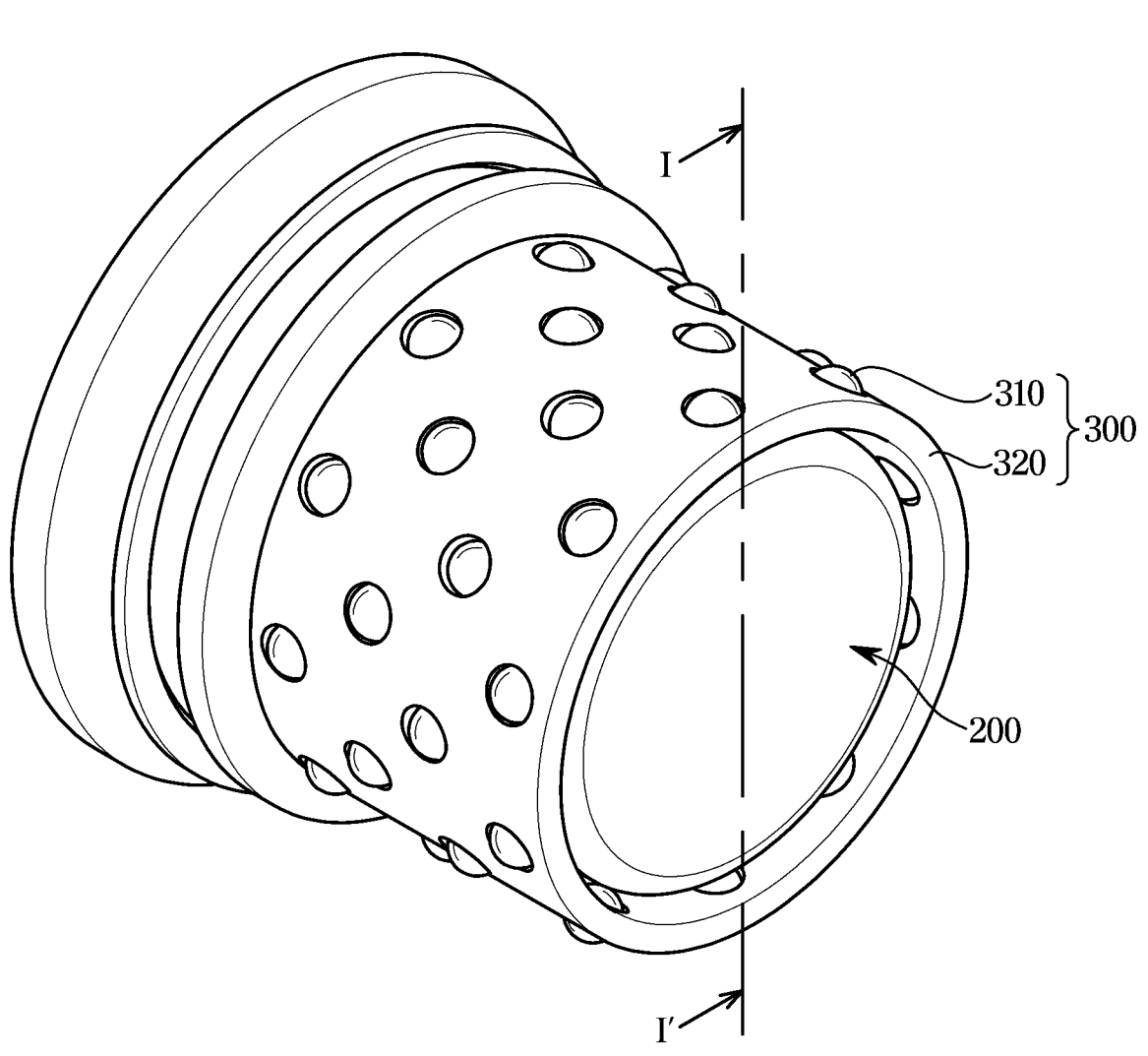
FIG. 1 is a perspective view illustrating a state in which a caliper brake device of a vehicle includes a friction reducing part according to an embodiment of the present disclosure.

Hereinafter, embodiments of the present disclosure will be described in detail with reference to the accompanying drawings. The following embodiments are provided to convey the spirit of the present disclosure to those skilled in the art. The present disclosure is not limited to the embodiments disclosed herein and may be implemented in different forms. In the drawings, portions which are not related to the description may be omitted for clarifying the present disclosure, and sizes of components may be exaggerated for facilitating understanding of the present disclosure.

Figure 2:
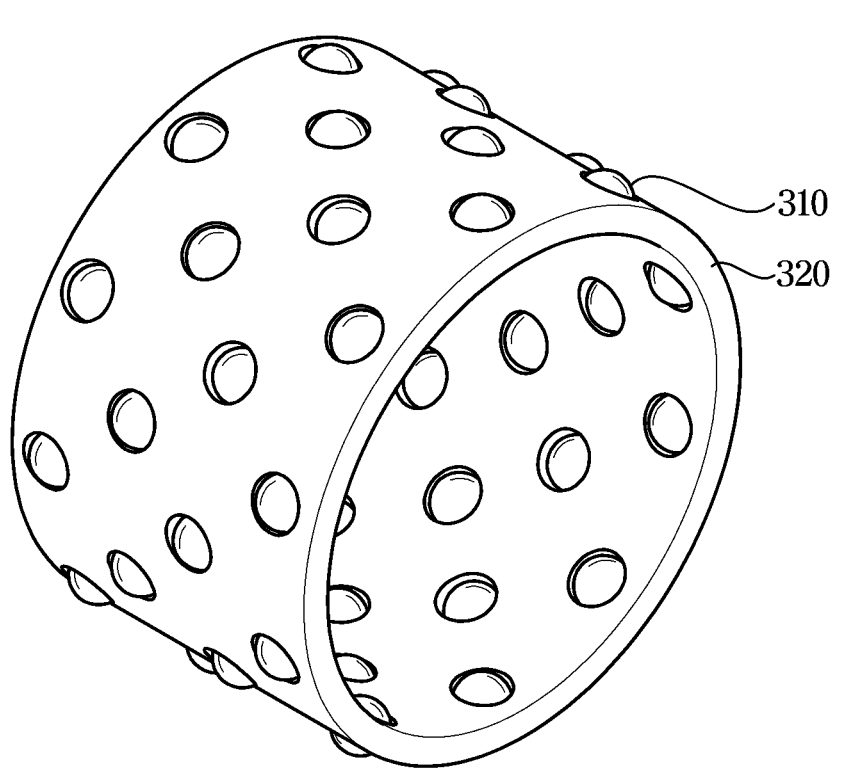
FIG. 2 is a perspective view illustrating the friction reducing part which is separated from the caliper brake device of the vehicle according to the embodiment of the present disclosure.
Figure 3:
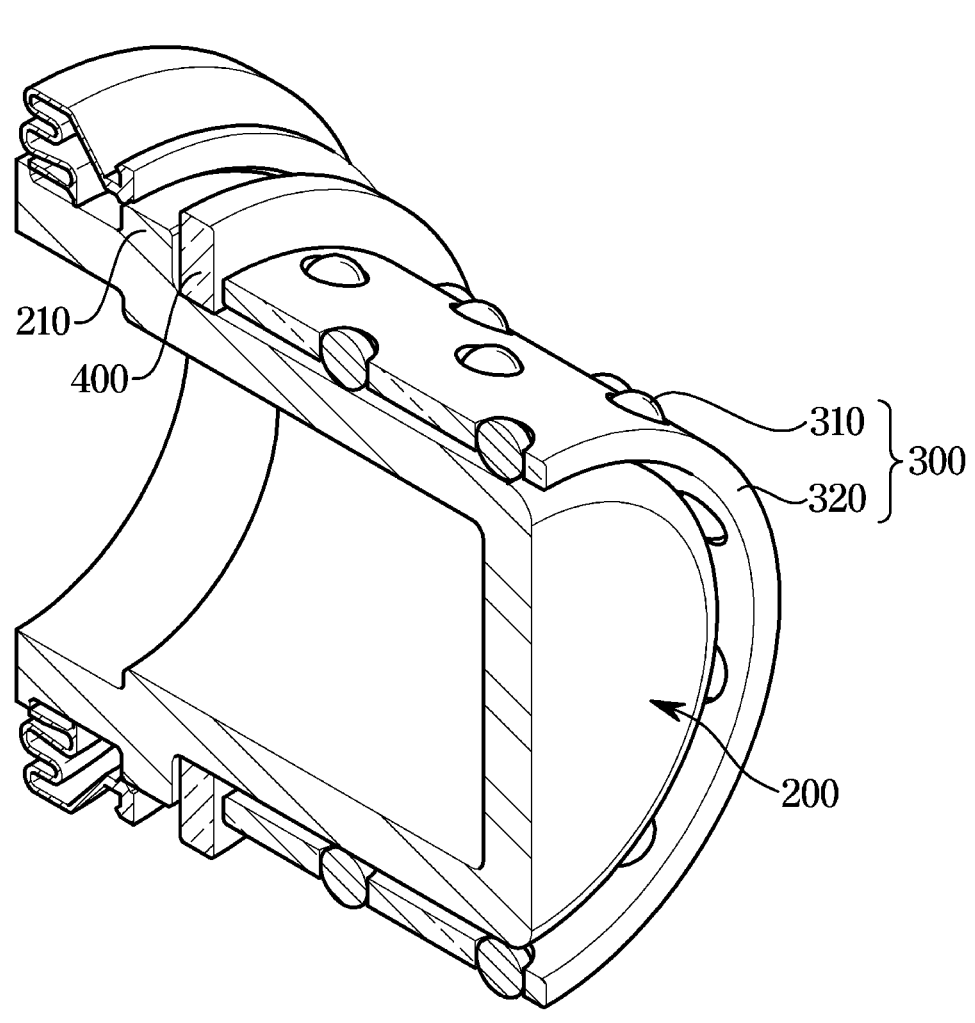
FIG. 3 is a cross-sectional view illustrating the caliper brake device along line I-I' of FIG. 1.

FIG. 1 is a perspective view illustrating a state in which a caliper brake device of a vehicle includes a friction reducing part 300 according to an embodiment of a present disclosure. FIG. 2 is a perspective view illustrating the friction reducing part 300 which is separated from the caliper brake device of the vehicle according to the embodiment of the present disclosure, and FIG. 3 is a cross-sectional view illustrating the caliper brake device along line I-I' of FIG. 1. Hereinafter, the structure, purpose, and effects of each component will be described with reference to FIGS. 1 to 3. Referring to FIGS. 1 to 3, the caliper brake device of the vehicle of the present disclosure includes a caliper housing 100 in which a cylinder is provided in a carrier (not shown) of the brake, a cylinder, the friction reducing part 300, and a support member 400 supporting the friction reducing part 300.

The caliper housing 100 is slidably installed in the carrier (not shown) in which a pair of pad plates are installed, and the cylinder is provided in the caliper housing 100. A piston 200 is provided to move forward to and backward from the pad plate on the cylinder.

The friction reducing part 300 includes a ball 310 interposed between an inner circumferential surface of the caliper housing 100 and an outer circumferential surface of the piston 200 and a cage 320 supporting the ball 310. Accordingly, during braking, the occurrence of conventional direct overall friction between the caliper housing 100 and the piston 200 is prevented through the friction reducing part 300. Accordingly, the durability of the caliper housing 100 and the piston 200 is increased to extend the lifetime of components and also increase the speed of the piston 200 during braking.

A front end portion of the cage 320 faces the support member 400, and a rear end portion thereof faces a rear inner surface of the cylinder. In addition, the cage 320 includes an opening 321 formed to pass therethrough in a radial direction thereof and to rotatably support the ball 310. Accordingly, in a case in which the caliper brake brakes and the piston 200 moves forward or backward, the ball 310 may be driven to rotate in place at a predetermined position, the ball 310 and the caliper housing 100 and the ball 310 and the piston 200 come into point contact. In this case, a friction area is greatly reduced compared to the conventional direct contact between caliper housing 100 and the piston 200.

A plurality of the balls 310 and a plurality of the openings 321 configured to accommodate a plurality of the balls 310 may be provided. The plurality of balls and the plurality of openings are arranged in a circumferential direction of the cage and a plurality of rows are arranged in an axial direction of the cage. In addition, the balls and the openings arranged in any one row may be arranged in the same phase or a different phase with respect to the balls and the openings arranged in an adjacent row. In this case, when the balls and the openings are arranged in the same phase, a line shape may be formed in the axial direction. When the balls and the openings are arranged in a different phase, the plurality of rows of balls and openings include a first row arranged in a first phase, a second row arranged in a second phase which is different from the first phase. In addition, the first row and the second row are alternately arranged in the axial direction of the cage and formed in a zigzag shape in the axial direction.

The brake of the caliper housing 100 of the vehicle according to the present disclosure shows a state in which the friction reducing part 300, which is provided with the ball 310 and the cage 320, is fastened to and removed from the piston 200. Referring to FIGS. 1 and 2, the plurality of openings 321 of the cage 320 and the plurality of balls 310 are arranged at equal intervals in the circumferential direction of the cage 320, and thus a total of 10 pieces are arranged, and four rows are arranged in the axial direction of the cage. In the plurality of rows, an outermost row positioned at one side of the piston is a first row which includes a first phase, and a second row is positioned next to the first row and includes a second phase in which a predetermined angle is greater than the first phase. The rows which include the first phase and the second phase are alternately arranged. In FIG. 1, an area of the ball 310 in contact with the inner circumferential surface of the caliper housing 100 may be identified. In FIG. 2, an area of the ball 310 in contact with the outer circumferential surface of the piston 200 may be identified. In FIG. 3, an operation state in which the ball 310 is in contact with the inner circumferential surface of the caliper housing 100 and the outer circumferential surface of piston 200 may be identified through a cross-sectional view. However, an arrangement of the openings 321 and the balls 310 is not limited to the shape and arrangement illustrated in FIGS. 1 to 3, and the arrangement includes all configurations which induce the indirect contact of the ball 310 between the caliper housing 100 and the piston 200.

Figure 4:
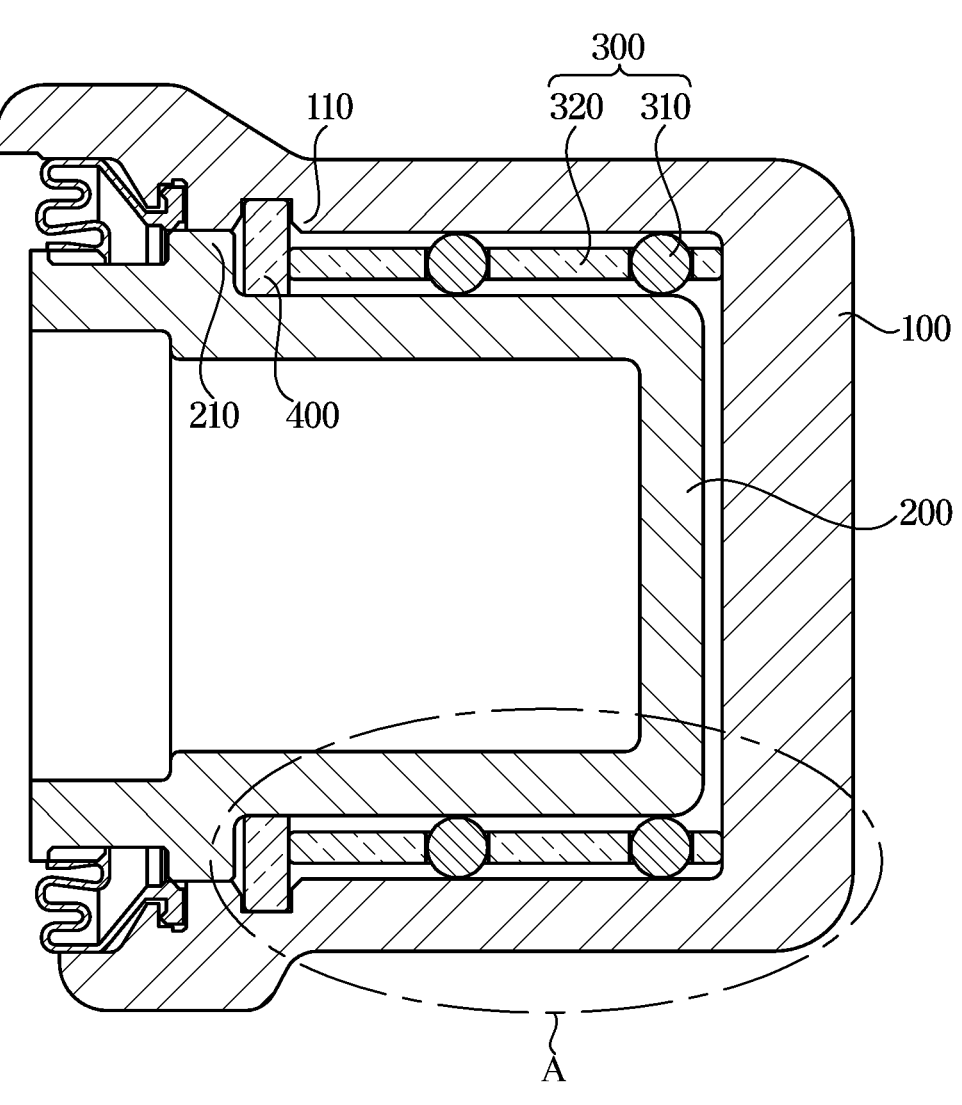
FIG. 4 is a side view illustrating a state in which a friction reducing part is supported by a support member and a stepped portion of a piston is in contact with the support member in the caliper brake device of the vehicle according to the embodiment of the present disclosure.
Figure 5:
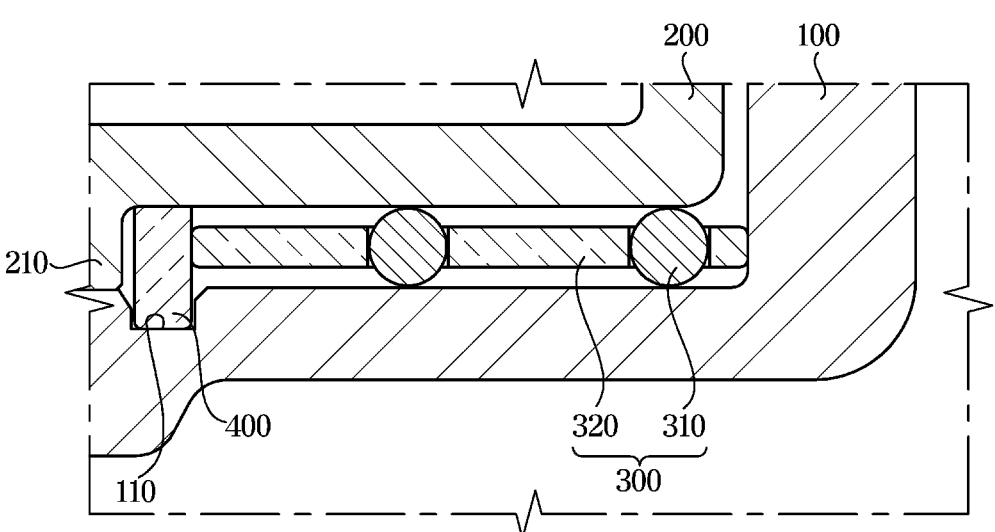
FIG. 5 is an enlarged view illustrating portion A of FIG. 4.

FIG. 4 is a side view illustrating a state in which a friction reducing part 300 is supported by the support member and a stepped portion 210 of the piston 200 is in contact with the support member 400 in the caliper brake device of the vehicle according to the embodiment of the present disclosure. FIG. 5 is an enlarged view of portion A of FIG. 4. Hereinafter, the structure, purpose, and effects of each component will be described with reference to FIGS. 4 and 5. Referring to FIGS. 4 and 5, in the brake device of a vehicle according to the present disclosure, the support member 400 may be formed as an elastic body and the support member 400 may also be formed in a ring shape. In addition, the piston 200 may include the stepped portion 210 and the caliper housing 100 may include an accommodation groove 110.

The support member 400 is provided between the caliper housing 100 and the piston 200 and supports the friction reducing part 300. In addition, a front surface of the support member 400 faces the stepped portion 210, and a rear surface of the support member 400 faces one side end of the cage 320. Accordingly, the friction reducing part 300 is prevented from separating from the inside of the caliper housing 100, and during braking of the caliper brake, the cage 320 of the friction reducing part 300 may be in a fixed state and only the ball 310 of the friction reducing part 300 may be rotated. In addition, the support member 400 may be provided as an elastic body which is elastically deformed by the displacement of the piston 200. Accordingly, when the piston 200 moves forward, one end fixed to the accommodation groove 110 of the support member 400 is deformed in the forward movement direction in a fixed state to provide a restoring force in a backward direction of the piston 200. That is, when the piston 200 starts to move backward, the support member 400 may easily start the backward movement by providing an external force in the backward direction. This is also the case when the piston moves backward and then moves forward. Although a shape of the support member 400 is provided as a ring shape, the outer circumferential surface is bound to the cylinder and the inner circumferential surface may be provided in close contact with the outer circumferential surface of the piston 200. Accordingly, the support member 400 may be easily assembled to the caliper housing 100 and also may block the inflow of a foreign material.

The stepped portion 210 may be included in the piston 200. That is, the piston 200 may include the stepped portion 210 protruding from the outer circumferential surface thereof in the radial direction and provided in contact with the support member 400. Accordingly, after the forward movement of the piston 200 is completed, by obtaining a restoring force of a support portion from a surface of the piston 200 in the axial direction, the stepped portion 210 included in the piston 200 may also obtain a restoring force of the support portion, and thus the piston 200 may be provided with a stronger external force in the backward direction of the piston 200.

The accommodation groove 110 may be included in the caliper housing 100. That is, the caliper housing 100 may include the accommodation groove 110 which is formed to be recessed in an inner circumferential surface of the cylinder in the radial direction and into which at least a part of the support member 400 is inserted. Accordingly, the support member 400 may be easily assembled and fixed.

The brake of the caliper housing 100 of the vehicle according to the present disclosure is in a state in which the piston 200 maximally moves backward in the cylinder of the caliper housing 100 and thus shows a state in which the stepped portion 210 of the piston 200 is in contact with the support member 400 while the friction reducing part 300 is supported by the support member 400. Referring to FIGS. 4 and 5, in the caliper housing 100, the support member 400 and the accommodation groove 110 to which the support member 400 may be coupled are provided at positions separated as much as a backward distance from the end of the cylinder and the piston 200 in the backward direction. The support member 400 is formed in a ring shape and the accommodation groove 110 is formed to be recessed in a ring shape corresponding to the shape of the support member 400. Accordingly, when the piston 200 moves backward, the cage 320 of the friction reducing part 300, which is installed on one side of the support member 400, is fixed and the ball 310 accommodated in the opening 321 of the cage 320 is driven to rotate in place, and then the caliper housing 100 and the piston 200 come into point contact with the ball 310. When the piston 200 starts to move backward, a restoring force is transmitted through a side surface and lower surface of the support member 400 which are in contact with the piston 200 to provide an external force to the piston 200 in the backward direction. However, the friction reducing part 300, the support member 400, the stepped portion 210, and the accommodation groove 110 are not limited to the shape and arrangement illustrated in FIGS. 4 and 5 and include all configurations which allow the caliper housing 100 and the piston 200 to come into indirect contact with the ball 310 and cause a restoring force.

According to the present disclosure, the caliper brake device of the vehicle having such a configuration extends the lifetime of the components by preventing the overall friction between the caliper housing 100 and the piston 200 during braking of the caliper brake and also increases the speed of the piston 200 during braking. In addition, through the support member 400 having an elastic body in which one end is fixed to the accommodation groove 110 provided in the caliper housing 100, when the piston 200 ends the forward movement and the backward movement and starts moving in the opposite direction, the backward movement easily starts by receiving a restoring force. The support member 400 and the accommodation groove 110 are formed in a ring shape and easily assembled and coupled, and thus the marketability of a caliper brake is increased by cost and process reduction.

During braking of a caliper brake of a vehicle according to a present disclosure, the overall friction between a caliper housing and a piston is prevented.

During braking of a caliper brake of a vehicle according to a present disclosure, an elastic restoring force is provided to assist a piston to move backward.

During braking of a caliper brake of a vehicle according to a present disclosure, the speed of a piston is increased.

What is claimed is:

1. A caliper brake comprising:
   a caliper housing slidably installed on a carrier, in which a pair of pad plates are installed, and provided with a cylinder;
   a piston configured to move forward to and backward from the pad plate on the cylinder; and
   a friction reducing part provided between an inner circumferential surface of the caliper housing and an outer circumferential surface of the piston,
   wherein the friction reducing part includes:
   a ball interposed between the inner circumferential surface of the caliper housing and the outer circumferential surface of the piston; and
   a cage configured to support the ball.

2. The caliper brake of claim 1, further comprising a support member provided between the cylinder and the piston and configured to support the friction reducing part.

3. The caliper brake of claim 2, wherein a front end portion of the cage faces the support member and a rear end portion thereof faces an inner rear surface of the cylinder.

4. The caliper brake of claim 2, wherein the piston includes a stepped portion protruding from the outer circumferential surface thereof in a radial direction and provided to be in contact with the support member.

5. The caliper brake of claim 4, wherein a front surface of the support member faces the stepped portion and a rear surface thereof faces one side end of the cage.

6. The caliper brake of claim 2, wherein the support member is provided in a ring shape, an outer circumferential surface thereof is bound to the cylinder, and an inner circumferential surface thereof is in close contact with the outer circumferential surface of the piston.

7. The caliper brake of claim 2, wherein the support member is provided as an elastic body which is elastically deformed by a displacement of the piston.

8. The caliper brake of claim 2, wherein the caliper housing includes an accommodation groove formed to be recessed in the inner circumferential surface of the cylinder in a radial direction and into which at least a part of the support member is inserted.

9. The caliper brake of claim 1, wherein the cage includes an opening formed to pass therethrough in a radial direction and configured to rotatably support the ball.

10. The caliper brake of claim 9, wherein the ball and the opening are provided as a plurality of balls and a plurality of openings, respectively.

11. The caliper brake of claim 10, wherein the plurality of balls and the plurality of openings are arranged in a circumferential direction of the cage, and a plurality of rows are arranged in an axial direction of the cage.

12. The caliper brake of claim 11, wherein the balls and the openings arranged in any one row are arranged in the same phase with respect to balls and openings arranged in adjacent rows.

13. The caliper brake of claim 11, wherein the balls and the openings in the plurality of rows are arranged in a different phase with respect to the balls and the openings arranged in adjacent rows.

14. The caliper brake of claim 11, wherein the plurality of rows of balls and openings include a first row arranged in a first phase and a second row arranged in a second phase which is different from the first phase, wherein the first row and the second row are alternately arranged in the axial direction of the cage.

\* \* \* \* \*